United States Patent

[11] 3,568,748

[72] Inventors T. O. Paine
 Acting Administrator of the National Aeronautics and Space Administration with Respect to an invention of;
 John N. Calandro, Goleta; Norman J. James, Panorama City; Ferenc Pavlics, Santa Barbara, Calif.
[21] Appl. No. 799,847
[22] Filed Feb. 17, 1969
[45] Patented Mar. 9, 1971

[54] RESILIENT WHEEL
 6 Claims, 4 Drawing Figs.
[52] U.S. Cl. ................................................ 152/250, 152/225
[51] Int. Cl. ................................................ B60c 7/06
[50] Field of Search ................................................ 152/157, 158, 250—279, 227—228, 209; 152/249

[56] References Cited
UNITED STATES PATENTS
| 556,498 | 3/1896 | Eddy | 152/259 |
| 2,670,023 | 2/1954 | Doran | 152/228X |
| 3,234,988 | 2/1966 | Cummings | 152/12 |

Primary Examiner—Arthur L. LaPoint
Assistant Examiner—George H. Libman
Attorneys—L. D. Wofford, Jr., W. H. Riggins and G. T. McCoy ABSTRACT: A resilient wheel comprising a woven wire tire clamped to the rim of a conical wheel disc. The tread surface of the wire tire has tread units comprising abrasive coated strips clamped to the wire tire and arranged in a herringbone pattern around the tread area of the tire. A relatively rigid annular frame is provided inside the wire tire that limits deflection of the tire under load.

PATENTED MAR 9 1971

JOHN N. CALANDRO
NORMAN J. JAMES
FERENC PAVLICS
INVENTORS

BY Wayland H. Riggins
ATTORNEYS

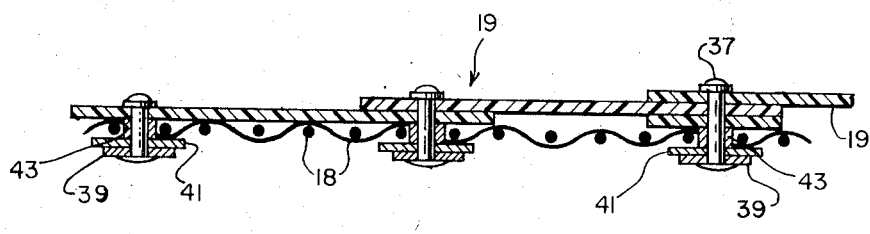
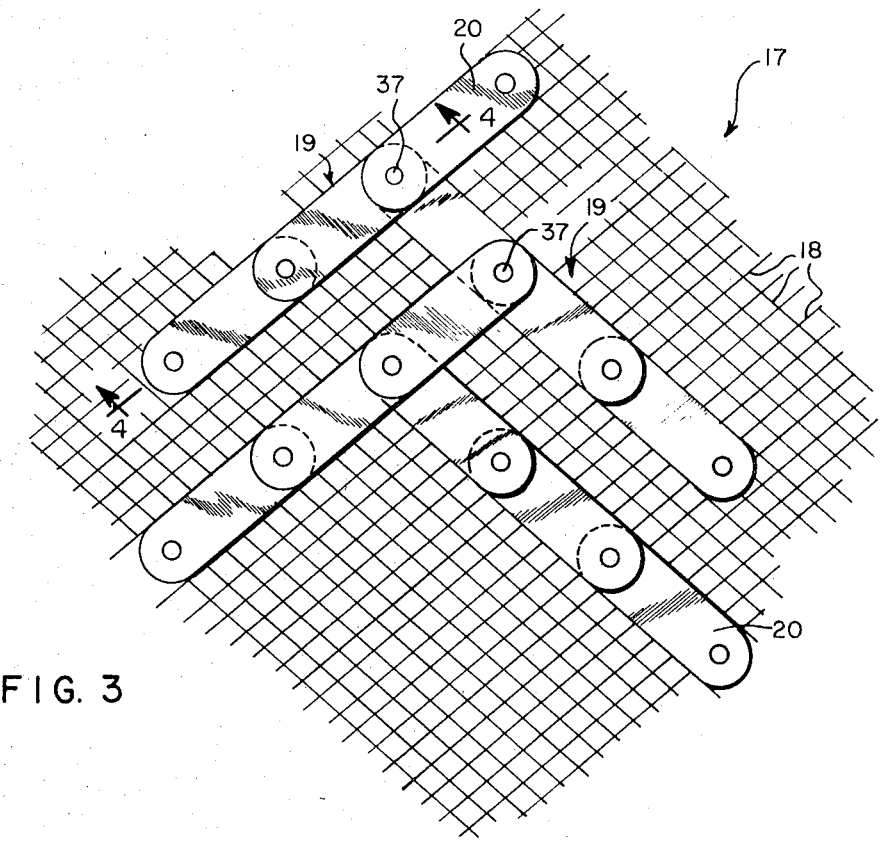

RESILIENT WHEEL

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates generally to resilient wheels and more particularly to wheels for supporting a vehicle traveling over an unprepared surface such as the surface of the moon.

Pursuant to future space exploration projects, wheeled vehicles are now being developed for the purpose of traveling over unprepared surfaces such as the surface of the moon. The wheels of such vehicles must have considerable resiliency for shock absorbing purposes, and must produce adequate traction between the tread surface of the wheels and the surface over which the vehicle is to travel. Further, it is important that the wheels have a reasonable wearing life and be relatively lightweight.

Wheels equipped with tires made of rubber and synthetic fiber would not be suitable for use in the lunar environment because these materials will decompose rapidly in the vacuum environment and in the extreme temperatures prevailing on the lunar surface. While resilient wheels made principally of metallic materials are known in the art, each of these prior wheels have features and characteristics which render them unsuitable for use on a lunar vehicle. More specifically, prior metallic resilient wheels are considered unsuitable for use on a lunar vehicle in one or more of the following respects: (1) unduly complicated and heavy; (2) the tread provides inadequate traction; (3) insufficient wearability.

SUMMARY OF THE INVENTION

The invention comprises a woven wire tire, tubular in cross section, clamped to the rim of a wheel disc. Tread units are attached to the tread surface of the woven tire in a regular pattern. The tread units are relatively short and are assembled so that the tread elements may flex and shift when the woven wire tire deflects as it rolls over the supporting surface. Within the wire tire is an annular frame that limits the degree of deflection imposed on the wire tire.

Accordingly, it is a general object of the present invention to provide an improved resilient wheel for supporting a vehicle traveling on unprepared surfaces.

A more specific object of the invention is to provide a resilient wheel for supporting a vehicle traveling on an irregular and unprepared surface that will provide adequate traction, bearing surface, and have a long wearability.

Another object of the invention is to provide a resilient wheel that will be suitable for supporting a vehicle rolling on unprepared surfaces, such as the lunar surface, that will not be unduly heavy and will not incorporate materials that will rapidly decompose in a vacuum environment.

These and other objects and advantages of the invention will become apparent upon reference to the following specification, attendant claims and drawing.

BRIEF DESCRIPTION OF THE DRAWING

FIG. 3 is a fragmentary view taken along line 3-3 of FIG. 1 showing the arrangement of tread units attached to the tread surface of the wheel;

FIG. 4 is a cross-sectional view taken along line 4-4 of FIG. 3.

DESCRIPTION OF THE PREFERRED EMBODIMENT

Figure 1:
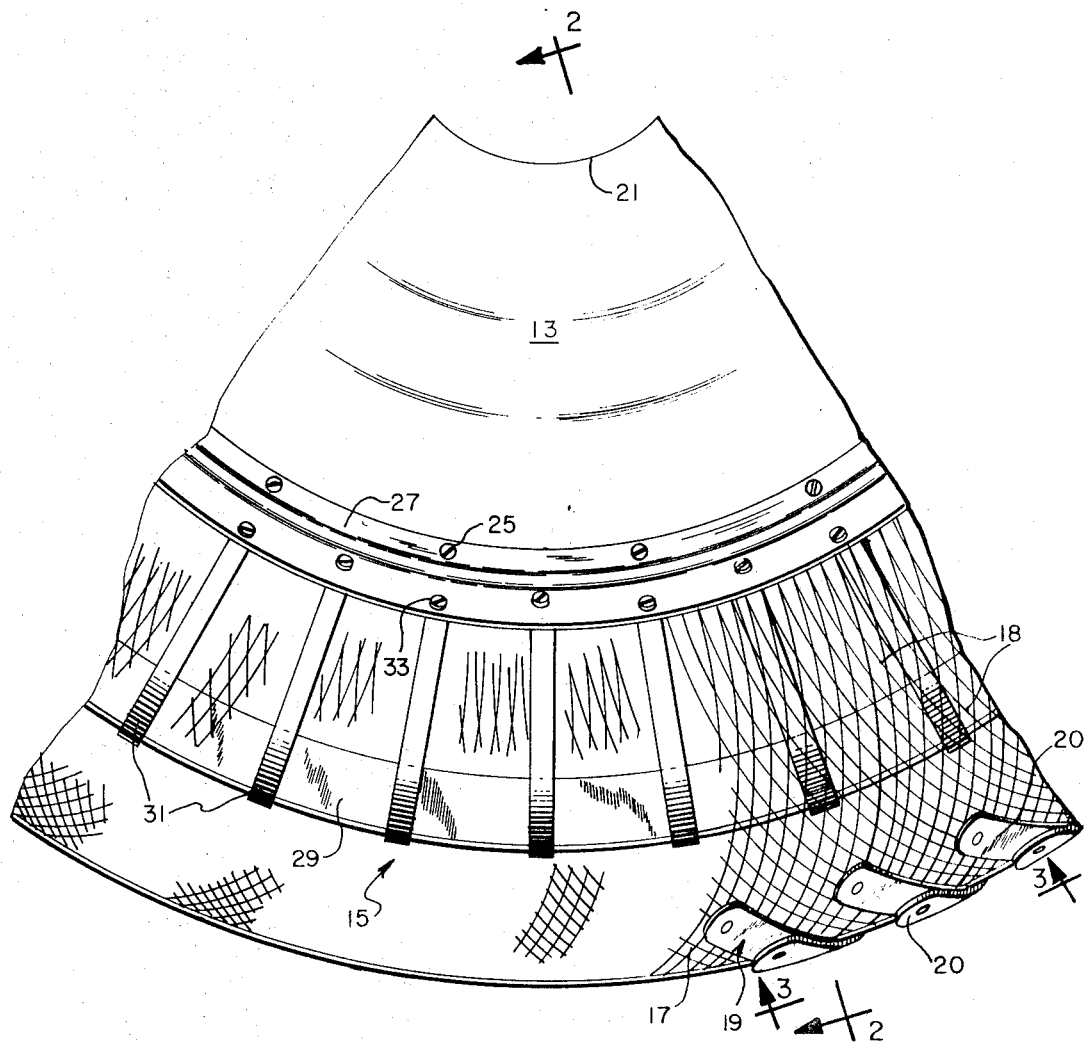
FIG. 1 is an elevational view of a portion of a resilient wheel embodying the present invention.
Figure 2:
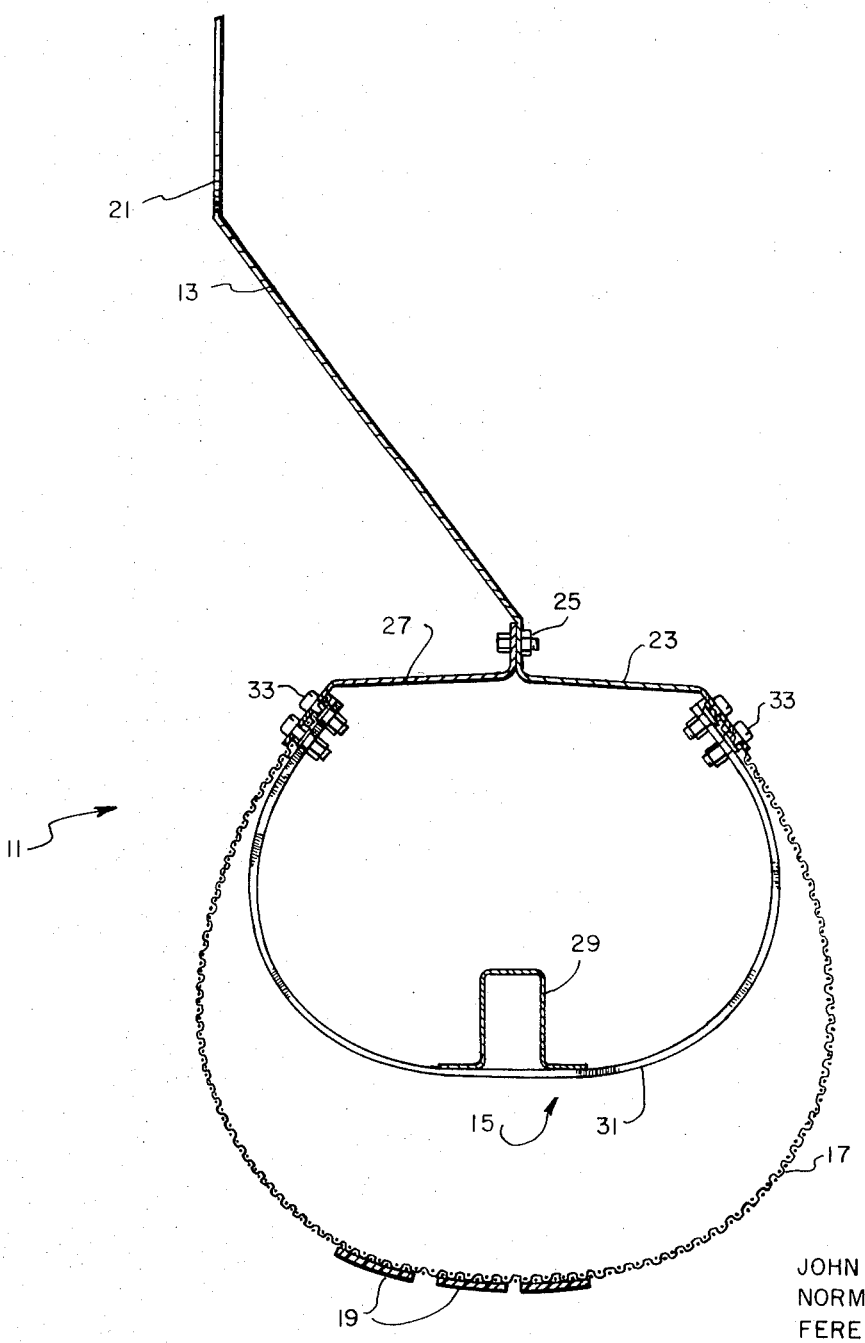
FIG. 2 is a cross-sectional view taken along line 2-2 of FIG. 1.

Referring to FIGS. 1 and 2, therein is shown a resilient wheel 11 the main components of which are a central wheel disc 13, and an inner frame 15 enclosed by a woven wire tire 17 with its attached tread units 19. The wheel disc 13 is of a conical configuration having a central hole 21 for receiving an axle and has an outer rim portion 23 to which is clamped by fasteners 25 a similar rim portion 27.

The inner frame 15 is circular, conforming to the rim of the wheel disc 13, and comprises a ring member 29 of hat-shaped cross section and regularly spaced straps 31 secured as by welding to the flanges of the ring 29.

Enclosing the inner frame 15 is the woven wire tire 17 comprising individual strands 18 that are made of high quality steel, such as music wire, and are curved diagonally from one side of the rim to the other side thereof. The wire tire 17 and frame 15 are clamped to the respective rim portions 23 and 27 by screws 33. The cross-sectional diameter of the woven wire tire 17 is considerably greater than the cross-sectional diameter of the inner frame 15 so that the tire 17 may deflect several inches under load before it contacts the relatively rigid inner frame 15. In the embodiment illustrated, a deflection space of about 3 inches exists between the wire tire 17 and the inner frame 15 at the vertical centerline.

FIG. 3 shows the tread units 19 being arranged in a herringbone pattern on the tread surface of the wire tire 17. The diagonally directed tread units 19 each comprises a row of three tread strips 20 joined end-to-end. The innermost tread strip 20 of each unit 19 is positioned with its center point coinciding with the circumferential centerline of the tread surface of the wire tire 17. Also the innermost tread strip 20 of each tread unit is connected to the reversely sloping unit at the point where the two units meet.

As shown in FIG. 4, the tread strips 20 are clamped to the strands 18 of the wire tire 17 by rivets, such as 37, provided with washers 39, and 41 and spacers 43. The ends of the tread strips 20 in a unit 19 are overlapped and the rivets extend through these overlapping ends. At the joints where one unit of tread strips joins another unit of tread strips the overlapping ends of three strips are present and the rivets 37 extend through these three overlapping ends. The tread strips are relatively short and when joined in the manner described are permitted a considerable degree of "play" at the pivoted joints such that the strips may shift with the wire tire as it flexes and flattens under load.

The tread strips 20 are preferably made of a polyimide material. One suitable material of this type is produced by the DuPont Company under the designation Vespal. The strips 20 are coated on their outer surface with an abrasive substance such as silicon carbide grit with the grit being bonded to the Vespal material with a polyimide binder material such as RC-5081 Pyralyn, also produced by the DuPont Company.

The materials indicated are well suited for providing proper traction and for withstanding extremely and low temperatures. The tread strips 20 have good durability and will prevent the woven wire tire 17 from being rapidly worn as would be the case if this wire made contact with the surface over which the vehicle was traveling.

Thus, the invention provides a durable and lightweight flexible wheel capable of providing adequate traction on an unprepared surface, such as the lunar surface, and incorporates tread units that are capable of shifting with the flexing of the tire of the wheel.

We claim:

1. A resilient wheel comprising:
    a substantially rigid support disposed centrally of said wheel and defining a circular periphery;
    a tire encircling said circular periphery of said support and being attached to said support;
    said tire comprising a resilient wire shell, the circumferential surface of which comprises a circular tread surface;

diagonally positioned tread units attached to said tread surface of said wire shell, said units being arranged in a regular pattern;

said tread units each comprising a plurality of adjacent read strips; and said strips of said tread units being pivotally connected to the adjacent strip of said unit whereby said strips may pivot when said wire shell flexes under load.

2. The invention as defined in claim 1 wherein said pivotal connections between said adjacent tread strips comprises a fastener having a portion extending through said strips and through said wire shell.

3. The invention as defined in claim 1 including a relatively rigid frame connected to and extending around said periphery of said support and disposed within said tire whereby said frame limits the amount of the deflection motion of said resilient shell.

4. The invention as defined in claim 3 wherein said frame comprises a circular ring member extending around said support, said member being joined to a series of curved straps arranged transversely of said member.

5. The invention as defined in claim 1 wherein said tread strips comprise a polyimide material coated with an abrasive substance.

6. The invention as defined in claim 5 wherein said polyimide material comprises Vespal and said abrasive substance comprises a silicon carbide grit.